United States Patent
Park et al.

[11] Patent Number: 6,095,295
[45] Date of Patent: Aug. 1, 2000

[54] ROTARY DAMPER

[75] Inventors: Young Jin Park, Taejun; Sang Hwa Kim, Busan, both of Rep. of Korea

[73] Assignee: Korea Advanced Institute Science and Technology, Taejun, Rep. of Korea

[21] Appl. No.: 09/169,057

[22] Filed: Oct. 9, 1998

[30] Foreign Application Priority Data

Oct. 9, 1997 [KR] Rep. of Korea .................. 97-51694

[51] Int. Cl.[7] ........................................ F16F 9/53
[52] U.S. Cl. ........................ 188/267.2; 192/21.5
[58] Field of Search ............... 188/267.2, 290, 188/322.5; 192/21.5; 267/140.14, 140.15

[56] References Cited

U.S. PATENT DOCUMENTS

| | | | |
|---|---|---|---|
| 4,350,913 | 9/1982 | Eddens | 192/21.5 |
| 5,257,681 | 11/1993 | Shtarkman et al. | 188/290 |
| 5,542,507 | 8/1996 | Warchocki et al. | 188/290 |
| 5,598,908 | 2/1997 | York et al. | 192/21.5 |
| 5,816,372 | 10/1998 | Carlson et al. | 188/267.2 |
| 5,921,357 | 7/1999 | Starkovich et al. | 188/267.2 |
| 5,988,336 | 11/1999 | Wendt et al. | 192/21.5 |

*Primary Examiner*—Chris Schwartz
*Attorney, Agent, or Firm*—Graybeal Jackson Haley LLP

[57] ABSTRACT

This invention is intended to provide a semi-active rotary damper that can obtain a large breaking force to disperse a large torque. The rotary damper 100 comprises a damping shaft 111 to be connected to a rotating shaft, and a closed hollow cylindrical housing 113 surrounding the damping shaft 111. A first fluid chamber 116A and a second fluid chamber 116B are formed between an outer face of the damping shaft 111 and an inner face of the housing 113 by a partition 115 and a wing 112. The first fluid chamber 116A and the second fluid chamber 116B are filled with magnetorheological fluid. Meanwhile, an annular solenoid 114 fixed to the housing 113 forms a portion of a flow path 126, 125 and 127 between the first fluid chamber 116A and the second fluid chamber 116B. When switching on the electric current through the coil 122, the annular body 121 is magnetized

7 Claims, 6 Drawing Sheets

PRIOR ART

ROTARY DAMPER

TECHNICAL FIELD

This invention relates to a rotary damper to break rotation in a machine, more specifically, a semi-active rotary damper in which a damping torque can be changed using a working fluid.

BACKGROUND ART

Development of a semi-active rotary damper has been considerably advanced. A semi-active rotary damper embodied using a working fluid such as an electrorheological or magnetorheological fluid whose properties are changed by changing intensity of an electric or magnetic field does not require complicated mechanical elements.

When the electrorheological or magnetorheological fluid is subject to an electric or magnetic field, particles contained in the fluid are connected to form chains resulting in that the fluid is changed from a liquid phase to a gel phase. In non-electric/magnetic field, the fluid acts as a Newtonian fluid whose shearing stress is proportional to strain rate. In an electric or magnetic field, however, the fluid acts as a Bingham fluid whose initial stress without strain is equal to a yielding stress because particles scattered in the fluid is rearranged to form chains.

A conventional rotary damper using a magnetorheological fluid obtains a damping torque in a directive shearing mode. As showed FIG. 6, the rotary damper 10 comprises a circular plated rotor 12 fixed to a damping shaft 11, and a couple of annular stators 13 and 14 disposed at two opposed sides of the rotor 12. The rotor 12 has a rim fixed at its periphery to have "T" shaped section. The stators 13 and 14 are connected with an annular non-magnetoconductive member interposed so that a space 16 for receiving the rotor 12 is formed. The space 16 is sealed by sealing members 17 and 18, and filled with the magnetorheological fluid. The stators 13 and 14 act as electromagnetic poles when the electric current flows through coil 21 and 22. The stators 13 and 14 have opposed polarities to form a magnetic field in the space 16.

Before forming the magnetic field, the magnetorheological fluid has a state as showed in FIG. 7A, while, after forming the magnetic field, the fluid has a state as showed in FIG. 7B. In FIG. 7A and FIG. 7B, reference numbers 23 and 24 are designated to the magnetic poles, and 25 is designated to magnetotactic particles contained in the magnetorheological fluid.

When a torque is transmitted to the damping shaft 11 of the rotary damper from a foreign rotating shaft, rotor 12 also rotates. To break rotating motion of the rotating shaft, the electric current is switched on through the coils 21 and 22 so that the magnetorheological fluid changed to a state as showed in FIG. 7B, whereby viscosity of the fluid is heightened. Thus, a frictional force between the circular plated rotor 12 and the magnetorheological fluid is enlarged to break rotation of the rotating shaft.

However, breaking force obtained in the directive shearing mode is not so large.

SUMMARY OF INVENTION

This invention is intended to solve the aforementioned problems by proposing a semi-active rotary damper that can obtain a large of breaking force to disperse a large torque.

According to the invention, a rotary damper for damping rotational motion of a rotating shaft is provided. The rotational damper comprises a damping shaft to be connected to the rotating shaft, a repulsive force generator for generating repulsive force to disperse rotational torque applied to the damping shaft, and a repulsive force controller for controlling the repulsive force. The repulsive force generator comprises a closed hollow cylindrical housing for surrounding a portion of the damping shaft, a partition arranged in an annular space formed between an outer face of the damping shaft and an inner face of the housing, and a wing fixed to the damping shaft to swing in the annular space. The annular space is divided into a first fluid chamber and a second fluid chamber by the partition and the wing. The first fluid chamber and the second fluid chamber are filled with a working fluid for the repulsive force upon swing of the wing. The working fluid is flowed along a narrowed flowing path to recover pressure equilibrium when differential pressure is occurred between the first fluid chamber and the second fluid chamber. The repulsive force controller controls a flow resistance of the working fluid by changing its viscosity.

The working fluid may comprise a magnetorheological or electrorheological fluid.

The repulsive force controller may comprise means for forming a magnetic or electric field having a controllable intensity in a zone including the flowing path. The means consists of a solenoid comprising a hollow annular body having a quadrilateral cross-section in which a side has a discontinuity, and a coil arranged in a cavity of the annular body. In this case, the annular body is magnetized two confronted ends at the discontinuity of the annular body with opposed polarities to each other; and the discontinuity of the annular body acts as a flowing path between the first fluid chamber and the second fluid chamber.

The rotary damper may further comprise a unidirectional bypass between the first fluid chamber and the second fluid chamber, through which the working fluid flows non-resistively.

Other advantages and features of the present invention will become apparent from the following description, including the drawings and claims.

BRIEF DESCRIPTION OF DRAWINGS

FIGS. 7A and 7B show schematic views of magnetorheological fluid between two opposed magnetic poles, wherein FIG. 7A represents a state under non-magnetization of the poles, and FIG. 7B represents a state under magnetization of the poles.

DETAILED DESCRIPTION OF PREFERRED EMBODIMENTS

Figure 1:
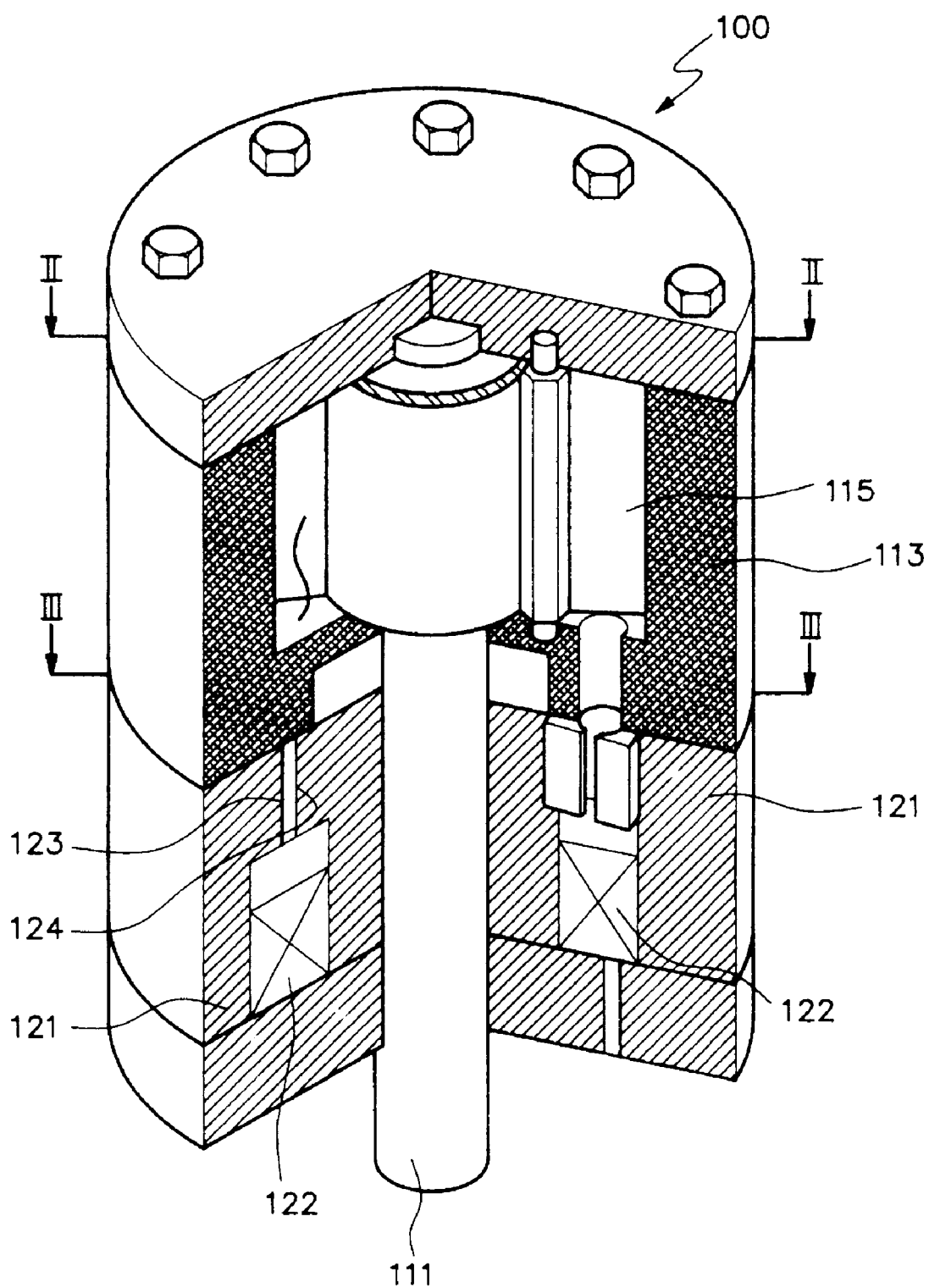
FIG. 1 shows a longitudinal perspective sectional view of an embodiment of the rotary damper according to this invention.
Figure 2:
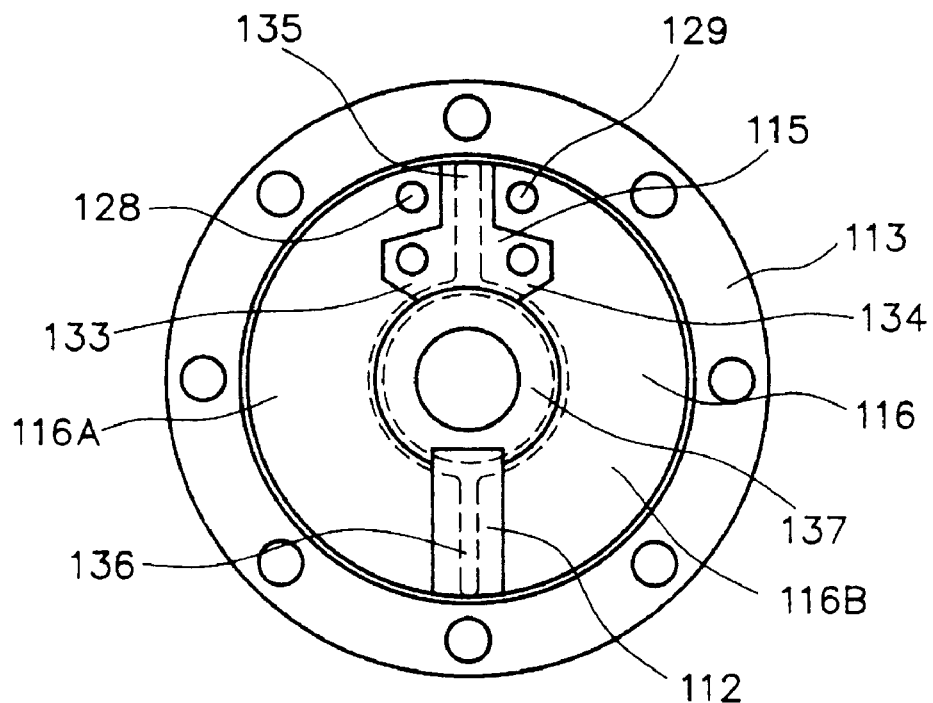
FIG. 2 shows a sectional view of the rotary damper taken along line II—II in FIG. 1.
Figure 3:
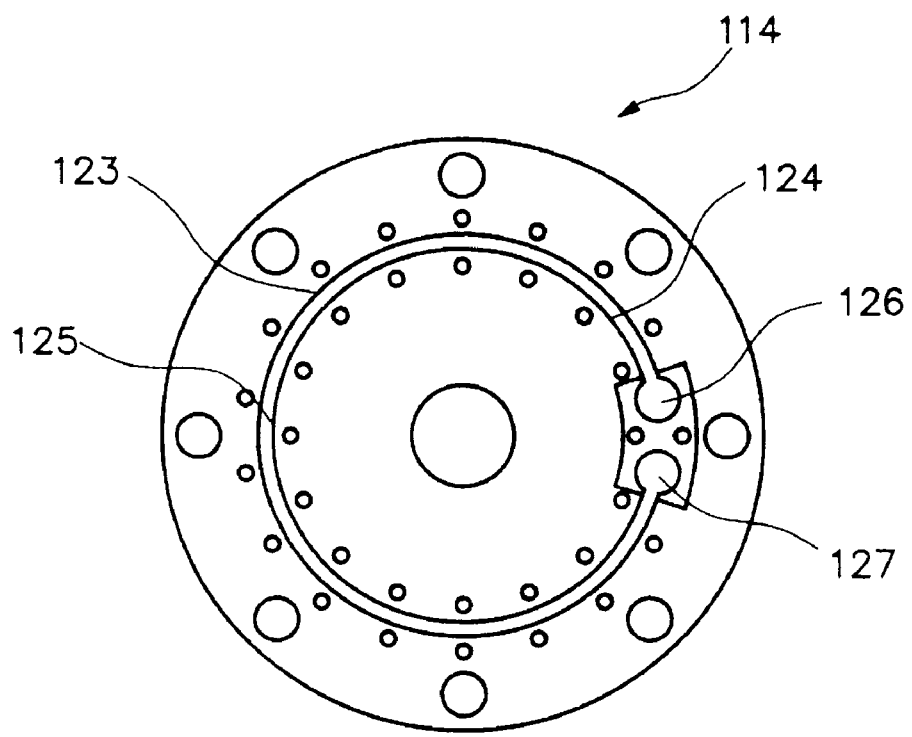
FIG. 3 shows a sectional view of the rotary damper taken along line III—III in FIG. 1.

As showed in FIG. 2 and FIG. 3, a rotary damper 100 according to an embodiment of this invention comprises a damping shaft 111 to be connected to a rotating shaft, and a closed hollow cylindrical housing 113 surrounding the damping shaft 111. An annular space 116 is formed between an outer face of the damping shaft 111 and an inner face of the housing 113. A partition 115 is fixed between the outer face of the damping shaft 111 and the inner face of the housing 113 in the annular space 116. Furthermore, a wing 112 fixed to the damping shaft 111 is positioned in the annular space 116 to swing along the annular space 116. The wing 112 extends to the inner face of the housing 113. The annular space 116 is divided into a first fluid chamber 116A and a second fluid chamber 116B by the partition 115 and the wing 112. The first fluid chamber 116A and the second fluid chamber 116B are filled with magnetorheological fluid.

Meanwhile, an annular solenoid 114 is fixed to the housing 113. Preferably, the annular solenoid 114 has an outer diameter corresponding to that of the housing 113. As showed in FIG. 3, the solenoid 114 comprises a hollow annular body 121 having a quadrilateral cross-section, in which a side of the quadrilateral has a discontinuation. A coil 122 is positioned in a cavity of the annular body 121. When switching on the electric current through the coil 122, the annular body 121 is magnetized, while the annular body 121 is not magnetization in switching off state.

Upon magnetization of the annular body 121, two confronted ends 123 and 124 of the annular body 121 at the discontinuation act as magnetic poles having opposed polarities to each other. Furthermore, an opened annular space 125 formed between the ends 123 and 124 connects a first cylindrical space 126 to a second cylindrical space 127.

Figure 4:
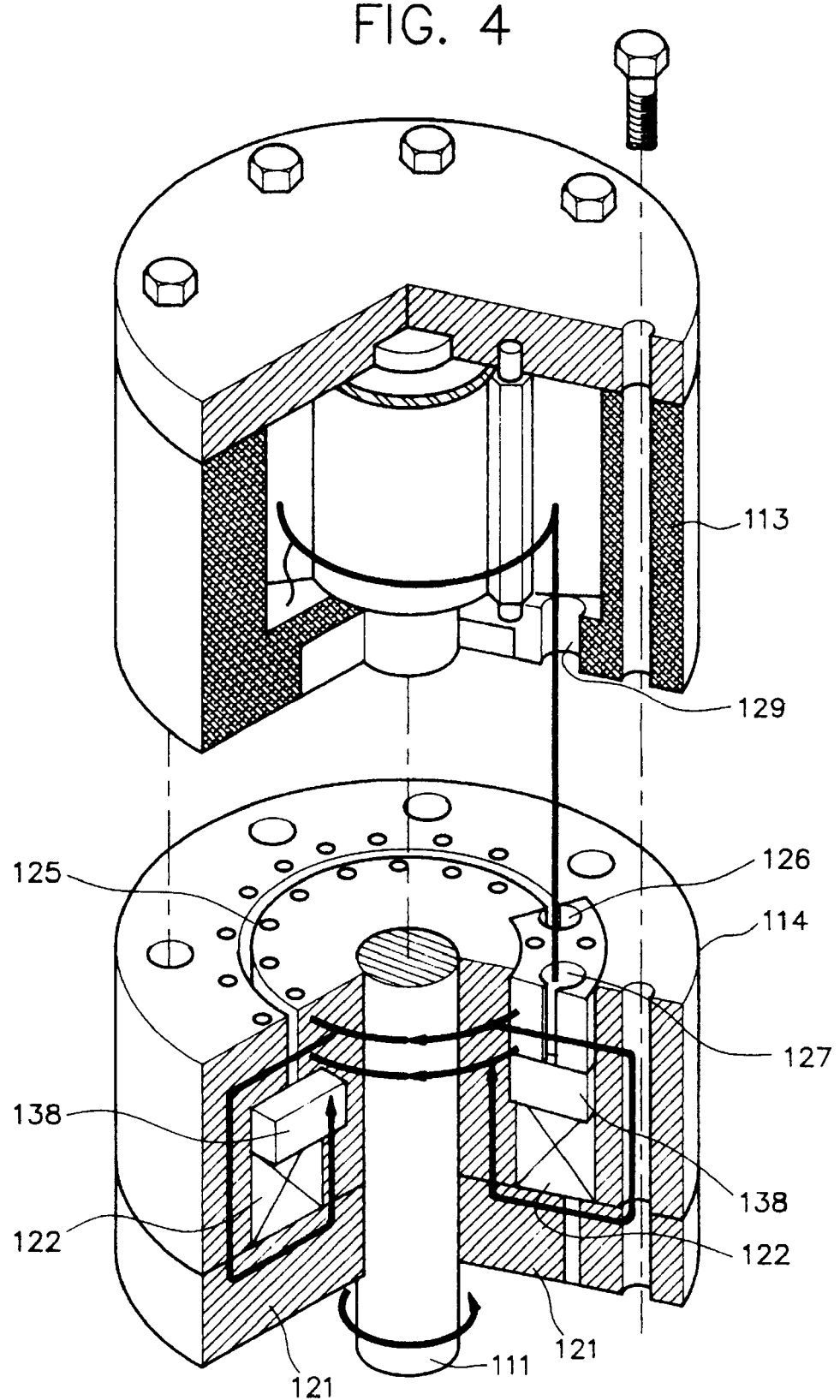
FIG. 4 shows a perspective exploded view of the rotary damper showed in FIG. 1 with a portion cut away.

As showed in FIG. 4, said housing 113 and said solenoid 114 are assembled so that the first cylindrical space 126 of the solenoid 114 is connected to the first fluid chamber 116A through a first hole 128 drilled on a bottom of the housing 113, while the second cylindrical space 127 of the solenoid 114 is connected to the second fluid chamber 116B through a second hole 129 drilled on the bottom of the housing 113. Thus, the magnetorheological fluid in the first fluid chamber 116A flows to the second fluid chamber 116B through the first hole 128, the first cylindrical space 126, the annular space 125, the second cylindrical space 127 and second hole 129.

The rotary damper according to this embodiment operates as follows.

Initially, the wing 112 is in abutment on a first projection 133 of the partition 115. When a torque is transmitted from a foreign rotating shaft to the damping shaft 111, the wing 112 swings along with the damping shaft 111 in the counter clockwise direction in FIG. 2 to abut on a second projection 134 of the partition 115.

During swing of the wing 112, the magnetorheological fluid in the first fluid chamber 116A flows to the second fluid chamber 116B through the first hole 128, the first cylindrical space 126, the annular space 125, the second cylindrical space 127 and the second hole 129. The rotating direction of the wing 112 and the flow direction of the magnetorheological fluid are represented by arrows in FIG. 4.

At this time, since a very high pressure is prevailed in the second fluid chamber 116B, while a hypo-atmosphere-pressure is prevailed in the first fluid chamber 116A, the wing 112 is forced toward the clockwise direction opposed to its rotating direction, such a repulsive force acts as a damping torque to disperse the rotational torque applied to the damping shaft 111 in the counter clockwise direction.

Meanwhile, when switching on the electric current through the coil 122 of the solenoid 114, a magnetic field is formed in the annular space 125, viscosity of the magnetorheological fluid passing through is heightened. As the viscosity is heightened, flow resistance of the magnetorheological fluid is heightened, whereby the repulsive force applied to the wing 112 is enlarged.

The viscosity of the magnetorheological fluid is proportional to an intensity of the magnetic field, that is, an intensity of the electric current through the coil. Accordingly, it is able to adjust a damping torque of the damping shaft 111 by adjusting the intensity of the electric current.

Figure 5:
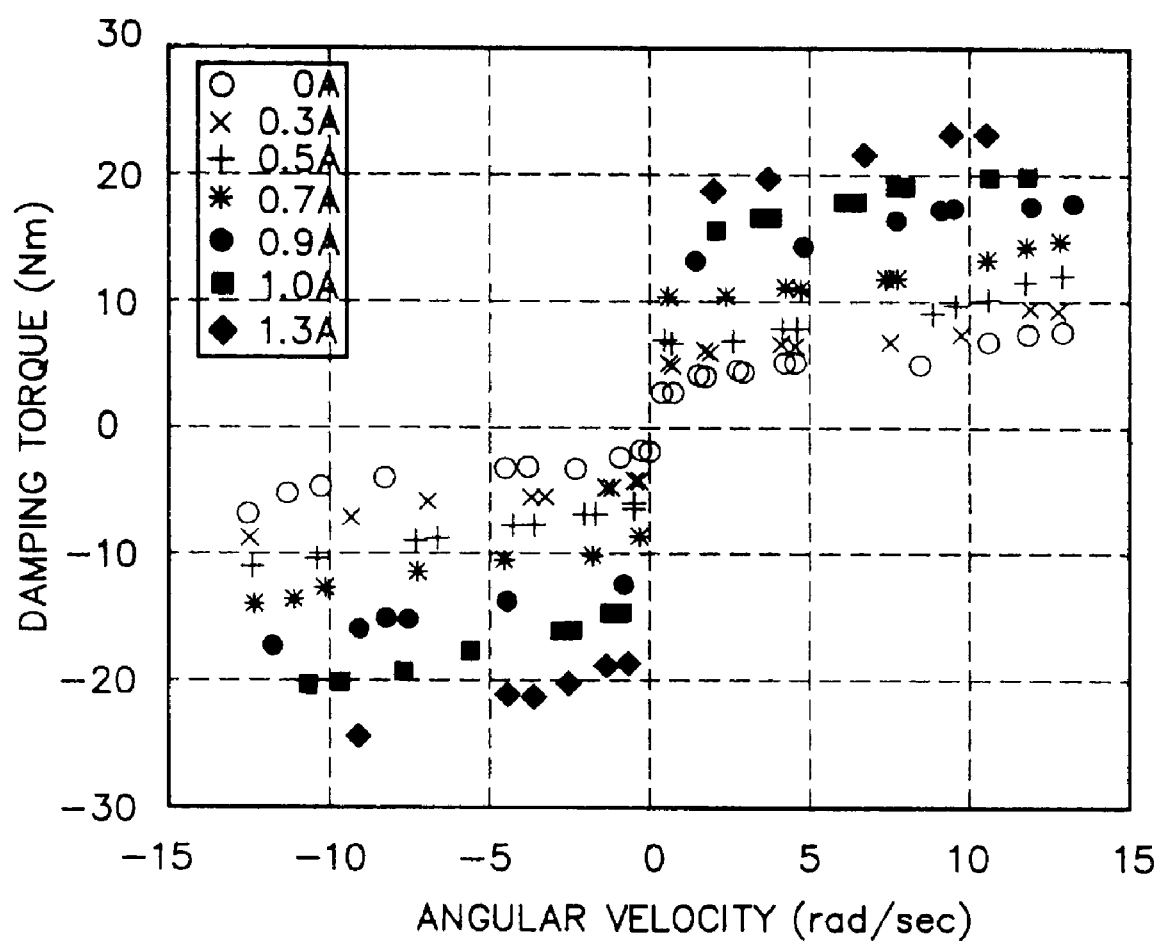
FIG. 5 shows a graph for explaining damping torque according to differential input currents and angular velocities by the rotary damper showed in FIG. 1.
Figure 6:
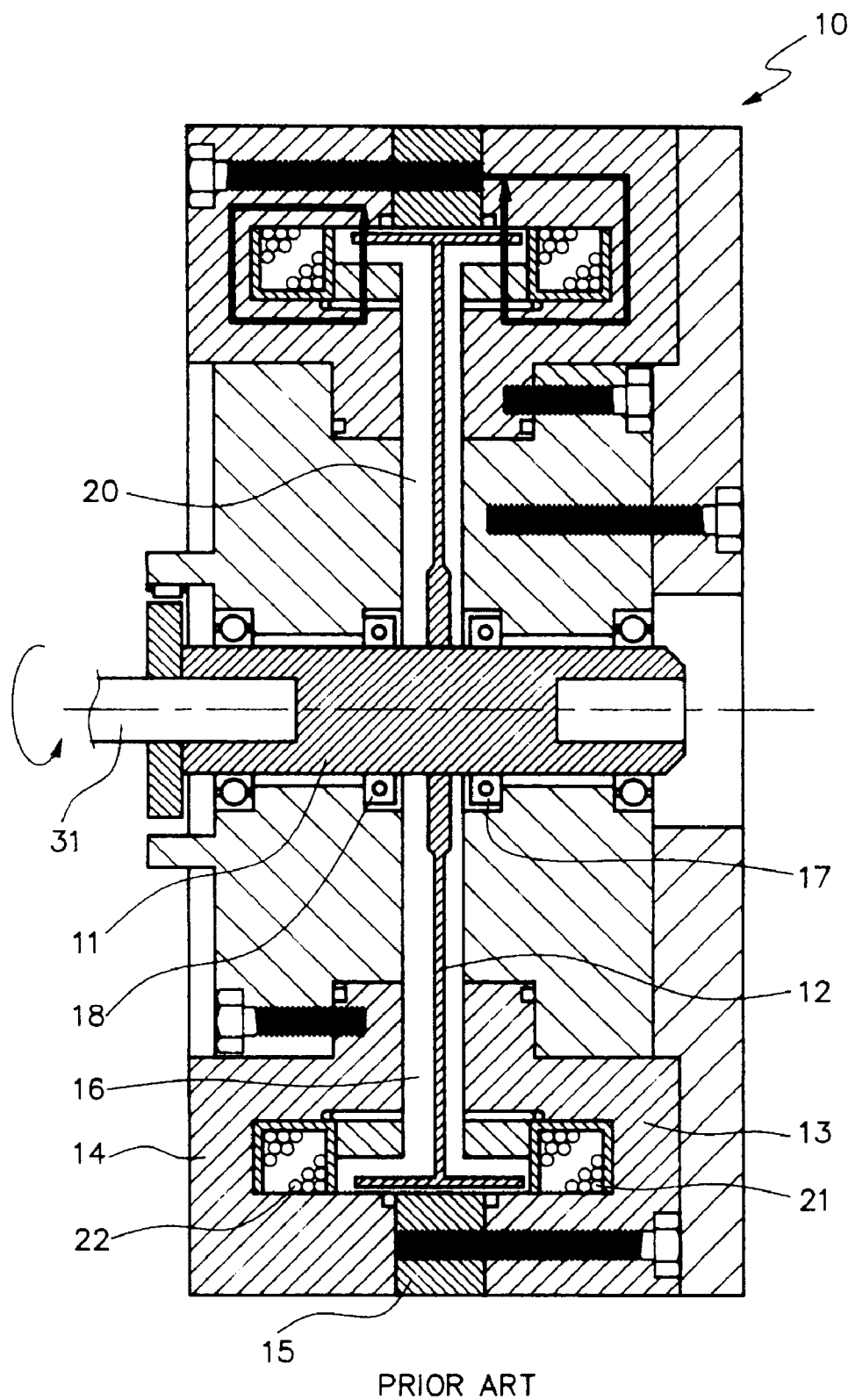
FIG. 6 shows a longitudinal sectional view of a conventional rotary damper.
Figure 7A:
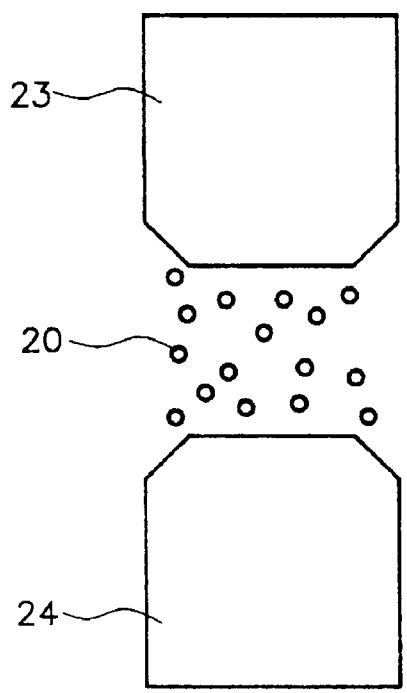
Figure 7B:
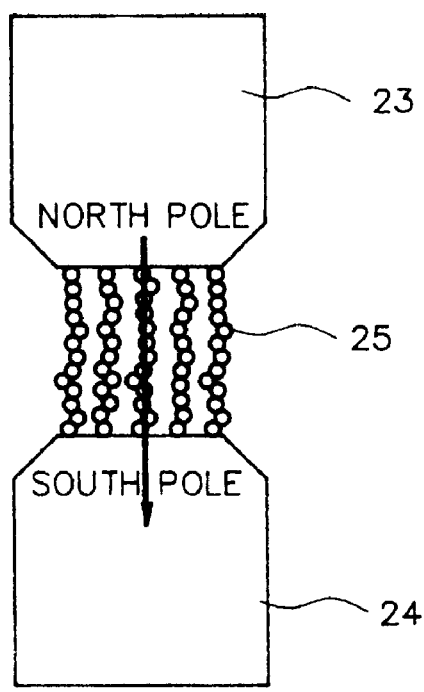

In FIG. 5, values of the damping torque obtained by the rotary damper according to this embodiment are showed, in which the values are measured in relation to current intensities and angular velocities. In this measurement, the current intensity is changed in several stages, that is, 0A, 0.3A, 0.5A, 0.7A, 0.9A, 1.0A and 1.3A; and the angular velocity is changed from −15 rad/sec to 15 rad/sec. From FIG. 5, it is understood that the damping torque is proportional to not only the current intensity but also the angular velocity.

Meanwhile, it is preferred to provide sealing members 135, 136 and 137 to the partition 115, the wing 112 and the damping shaft 111 to prevent the magnetorheological fluid from leaking. The sealing member 135, 136 provided to the partition 115 and the wing 112 may be an unidirectional sealing member so that they inhibit the magnetorheological fluid in the first fluid chamber 116A from flowing to the second fluid chamber 116B, while they allow the magnetorheological fluid in second fluid chamber 116B to flow to the first fluid chamber 116A.

Moreover, an unidirectional flow path may be provided to the partition 115 and the wing 112, through which the magnetorheological fluid in second fluid chamber 116B can flow to the first fluid chamber 116A, while the magnetorheological fluid in the first fluid chamber 116A can not flow to the second fluid chamber 116B.

Furthermore, a sealing member 138 is provided to a side of the annular space 125 to prevent the magnetorheological fluid from flowing toward the coil 122.

The rotary damper according to this invention can be applied a rotating shaft requiring very high damping torque.

Although the above detailed explanation for the present invention is relied on several preferred embodiments, these are not for limiting but for exemplifying the present invention. Variable alterations, changes or modulations within the technical idea of the present invention will be apparent to one skilled in this technical field.

What is claimed is:

1. A rotary damper comprising a damping shaft for damping rotational torque of a rotating shaft connected thereto, a repulsive force generator for generating repulsive force to disperse rotational torque applied to the damping shaft, and a repulsive force controller for controlling the repulsive force, characterized in that:

said repulsive force generator comprises a closed hollow cylindrical housing for surrounding a portion of said damping shaft, a partition arranged in an annular space formed between an outer face of said damping shaft and an inner face of said housing, and a wing fixed to said damping shaft to swing in said annular space;

said annular space is divided into a first fluid chamber and a second fluid chamber by said partition and said wing;

said first fluid chamber and said second fluid chamber are filled with a working fluid for the repulsive force upon swing of said wing;

said working fluid is flowed along a narrowed flowing path to recover pressure equilibrium when differential pressure is occurred between said first fluid chamber and said second fluid chamber; and said repulsive force controller controls flow resistance of said working fluid by changing its viscosity.

2. A rotary damper according to claim 1, characterized in that said working fluid comprises a magnetorheological fluid.

3. A rotary damper according to claim 2, characterized in that said repulsive force controller comprises means for forming a magnetic field having a controllable intensity in a zone including said flowing path.

4. A rotary damper according to claim 1, characterized in that said working fluid comprises an electrorheological fluid.

5. A rotary damper according to claim 4, characterized in that said repulsive force controller comprises means for forming an electric field having a controllable intensity in a zone including said flowing path.

6. A rotary damper according to claim 3, characterized in that:

said repulsive force controller consists of a solenoid comprising a hollow annular body having a quadrilateral cross-section in which a side has a discontinuity, and a coil arranged in a cavity of said annular body;

said annular body is magnetized two confronted ends at said discontinuity of said annular body with opposed polarities to each other; and said discontinuity of said annular body acts as a flowing path between said first fluid chamber and said second fluid chamber.

7. A rotary damper according to claim 6, characterized in that said rotary damper further comprises an unidirectional bypass between said first fluid chamber and said second fluid chamber, through which said working fluid flows non-resistively.

* * * * *